(12) United States Patent
Koga

(10) Patent No.: US 7,046,614 B2
(45) Date of Patent: May 16, 2006

(54) OPTICAL PICKUP

(75) Inventor: Mio Koga, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 526 days.

(21) Appl. No.: 10/348,745

(22) Filed: Jan. 22, 2003

(65) Prior Publication Data

US 2003/0156526 A1    Aug. 21, 2003

(30) Foreign Application Priority Data

Feb. 18, 2002    (JP)    ............... 2002-040164

(51) Int. Cl.
*G11B 7/00*    (2006.01)
(52) U.S. Cl. ............... 369/120; 369/121; 369/112.16
(58) Field of Classification Search ........... 369/112.16; 720/685, 683
See application file for complete search history.

(56) References Cited

U.S. PATENT DOCUMENTS

| | | | |
|---|---|---|---|
| 5,539,767 A * | 7/1996 | Nakanishi et al. ........... | 372/109 |
| 6,093,962 A * | 7/2000 | Ikegame ...................... | 257/728 |
| 2001/0004347 A1* | 6/2001 | Koga et al. .................. | 369/116 |
| 2003/0035358 A1* | 2/2003 | Ito .......................... | 369/112.01 |

FOREIGN PATENT DOCUMENTS

| | | |
|---|---|---|
| JP | 5-282693 | 10/1993 |
| JP | 5-323178 | 12/1993 |
| JP | 8-7321 | 1/1996 |
| JP | 9-185835 | 7/1997 |
| JP | 2000-149301 | 5/2000 |
| JP | 2001-189027 | 7/2001 |
| JP | 2002-232066 | 8/2002 |
| JP | 2003-59075 | 2/2003 |

OTHER PUBLICATIONS

Patent Abstracts of Japan, publication No. 05-323178; date of publication Dec. 7, 1993, 1 page.
Patent Abstracts of Japan, publication No. 2000-149301, date of publication May 30, 2000, 1 page.
Patent Abstracts of Japan, publication No.: 05-282693, publication date Oct. 29, 1993, 1 page.

(Continued)

*Primary Examiner*—Nabil Hindi
*Assistant Examiner*—Crystal Jones
(74) *Attorney, Agent, or Firm*—Osha Liang LLP

(57) ABSTRACT

In an optical pickup projecting a laser beam from a laser diode onto a disk through a half mirror, a collimator lens and an objective lens and receiving the laser beam reflected by the disk in a photodiode through the half mirror thereby reading information recorded in the disk, a portion of a metal board body having a pattern of a printed board corresponding to a connector pin fed with a high-frequency signal is notched to cause no electrostatic capacitance between the metal board body and the printed board thereby preventing a read signal from the photodiode from a jitter. Thus obtained is a high-performance and low-priced optical pickup causing no reading error.

5 Claims, 6 Drawing Sheets

OTHER PUBLICATIONS

Patent Abstracts of Japan, publication No.: 09-185835, publication date Jul. 15, 1997, 1 pages.
Patent Abstracts of Japan, publication No.: 2001-189027, publication date Jul. 10, 2001, 1 page.
Patent Abstracts of Japan, publication No.: 2002-232066, publication date Aug. 16, 2002, 1 page.
Patent Abstracts of Japan, publication No.: 2003-059075, publication date Feb. 28, 2003, 1 page.

Patent Abstracts of Japan; publication No. 08007321 A, publication dated Jan. 12, 1996, 1 pg.

* cited by examiner

OPTICAL PICKUP

BACKGROUND OF THE INVENTION

1. Field of the Invention

The present invention relates to an optical pickup, and more particularly, it relates to a high-performance and low-priced optical pickup, employed for a disk player such as a DVD, for example, causing no reading error.

2. Description of the Background Art

For example, Japanese Patent Laying-Open No. 8-7321 describes an optical pickup. FIG. 8 is a schematic sectional view showing an example of such a conventional optical pickup. Referring to FIG. 8, a photodiode PD is arranged in an opening 3a formed on an end of a light transmission hole 3 provided with a half mirror 2 in a pickup body 1, while a collimator lens CL and an objective lens OL are arranged in another opening 3b formed on another end of the light transmission hole 3. A laser diode LD is stored in a branch hole 4 formed on a side surface of the pickup body 1. A printed board 6 connected with the photodiode PD and the laser diode LD through flexible cables 5 is fixed to the outer peripheral surface of the pickup body 1 with a machine screw 7.

A support substrate 8 supports the laser diode LD. A plug-in unit 10 is connected to a connector 9 fixed to the printed board 6 thereby connecting the photodiode PD and the laser diode LD to a control part (not shown) such as a microcomputer.

In the optical pickup shown in FIG. 8, the laser diode LD projects a laser beam onto a disk D through the half mirror 2, the collimator lens CL and the objective lens OL and the photodiode PD receives the laser beam reflected by the disk D through the half mirror 2 thereby reading information recorded in the disk D.

In this case, however, the laser diode LD disadvantageously generates heat due to the projection of the laser beam, and is reduced in capacity. In general, therefore, the pickup body 1 is molded by die-cast aluminum for prompting heat dissipation, while such a pickup body 1 of die-cast aluminum is high-priced.

Therefore, the pickup body 1 may be molded by low-priced hard synthetic resin while forming the support substrate 8 for the laser diode LD by a metal plate thereby prompting heat dissipation.

In the aforementioned structure, the metal support substrate 8 for the laser diode LD prompts heat dissipation. When the size of the support substrate 8 is increased for improving the heat dissipation effect, however, the bulked support substrate 8 comes into contact with a peripheral device. Therefore, the support substrate 8 is limited in size. When a high-performance laser diode LD is employed, further, the pickup body 1 is thermally expanded and deformed as shown by a phantom line in FIG. 8 due to high calorific power of the laser diode LD, and an optical axis O connecting the photodiode PD and the objective lens OL may be bent to cause a reading error. Therefore, the laser diode LD must be formed by that having low calorific power, disadvantageously leading to a narrow selection range for the laser diode LD.

SUMMARY OF THE INVENTION

Accordingly, a principal object of the present invention is to provide a high-performance and low-priced optical pickup causing no reading error.

According to a first aspect of the present invention, the optical pickup has a photodiode arranged in an opening formed on an end of a light transmission hole provided with a half mirror in a pickup body of synthetic resin, a collimator lens and an objective lens arranged in an opening formed on another end of the light transmission hole and a laser diode stored in the light transmission hole on a position opposed to the half mirror. A printed board connecting the photodiode and the laser diode to a connector through cables is provided on the outer peripheral surface of the pickup body. Such structure as described above is aimed at projecting a laser beam from the laser diode onto a disk through the half mirror, the collimator lens and the objective lens and receiving the laser beam reflected by the disk in the photodiode through the half mirror, thereby reading information recorded in the disk. In this optical pickup, a board body of the printed board consists of a metal plate, and a metal plate portion of the printed board corresponding to a connector pin portion and a wiring pattern fed with a high-frequency signal is notched. An extension integrally provided on a metal support substrate for the laser diode is inserted in a concave groove formed on the outer peripheral surface of the pickup body for fixing the board body to the pickup body thereby bringing the board body into close contact with the extension and the outer peripheral surface of the pickup body.

In the metal plate forming the board body, the portion corresponding to the connector pin portion and the wiring pattern fed with the high-frequency signal is notched as hereinabove described, to cause no electrostatic capacitance between the metal plate and the printed board. Therefore, the high-frequency signal can be prevented from a jitter, not to influence a tracking signal.

Further, the metal board body of the printed board can positively dissipate heat transmitted to the pickup body of synthetic resin to the atmosphere. Therefore, the pickup body is neither thermally expanded nor deformed through heat generated by the laser diode but an optical axis connecting the photodiode and the objective lens with each other can be linearly maintained in a prescribed manner for preventing a reading error, similarly to a conventional metal pickup.

The board body of the printed board and the metal support substrate for the laser diode are brought into close contact with each other through the extension, whereby a heat dissipation area can be enlarged without increasing the size of the support substrate. Thus, a high-performance laser diode having high calorific power can also be used in a wide selection range, for manufacturing a high-performance optical pickup at a low cost.

According to a second aspect of the present invention, the optical pickup has a photodiode arranged in an opening formed on an end of a light transmission hole provided with a half mirror in a pickup body of synthetic resin, a collimator lens and an objective lens arranged in an opening formed on another end of the light transmission hole and a laser diode stored in the light transmission hole on a position opposed to the half mirror. A printed board connecting the photodiode and the laser diode to a connector through cables is provided on the outer peripheral surface of the pickup body. Such structure as described above is aimed at projecting a laser beam from the laser diode onto a disk through the half mirror, the collimator lens and the objective lens and receiving the laser beam reflected by the disk in the photodiode through the half mirror, thereby reading information recorded in the disk. In this optical pickup, a board body of the printed board consists of a metal plate, and at least a metal plate portion of the printed board corresponding to a connector pin portion fed with a high-frequency signal is notched.

In the metal plate forming the board body, at least the portion of the printed board corresponding to the connector pin portion fed with the high-frequency signal is notched as hereinabove described, to cause no electrostatic capacitance between the metal plate and the printed board. Therefore, the high-frequency signal can be prevented from a jitter, not to influence a tracking signal.

Further, the metal board body of the printed board can positively dissipate heat transmitted to the pickup body of synthetic resin to the atmosphere, whereby the pickup body is neither thermally expanded nor deformed through heat generated by the laser diode. Therefore, an optical axis connecting the photodiode and the objective lens with each other can be linearly maintained in a prescribed manner for preventing a reading error, similarly to a conventional metal pickup.

In the aforementioned optical pickup according to the second aspect of the present invention, the board body and a metal support substrate for the laser diode may be brought into contact with each other.

The board body of the printed board and the metal support substrate for the laser diode are brought into contact with each other through the extension as hereinabove described, whereby a heat dissipation area can be enlarged without increasing the size of the support substrate. Thus, a high-performance laser diode having high calorific power can also be used in a wide selection range.

In the aforementioned optical pickup according to the second aspect, an extension integrally provided on the metal support substrate for the laser diode may be inserted in a concave groove formed on the outer peripheral surface of the pickup body for fixing the board body to the pickup body thereby bringing the board body into close contact with the extension and the outer peripheral surface of the pickup body.

Thus, the board body of the printed board and the metal support plate for the laser diode are brought into close contact with each other through the extension, whereby the heat radiation area can be enlarged without increasing the size of the support substrate. Thus, a high-performance laser diode having high calorific power can also be used in a wide selection range. Further, the board body of the printed board is brought into close contact with the outer peripheral surface of the pickup body, thereby positively dissipating heat from the pickup body.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
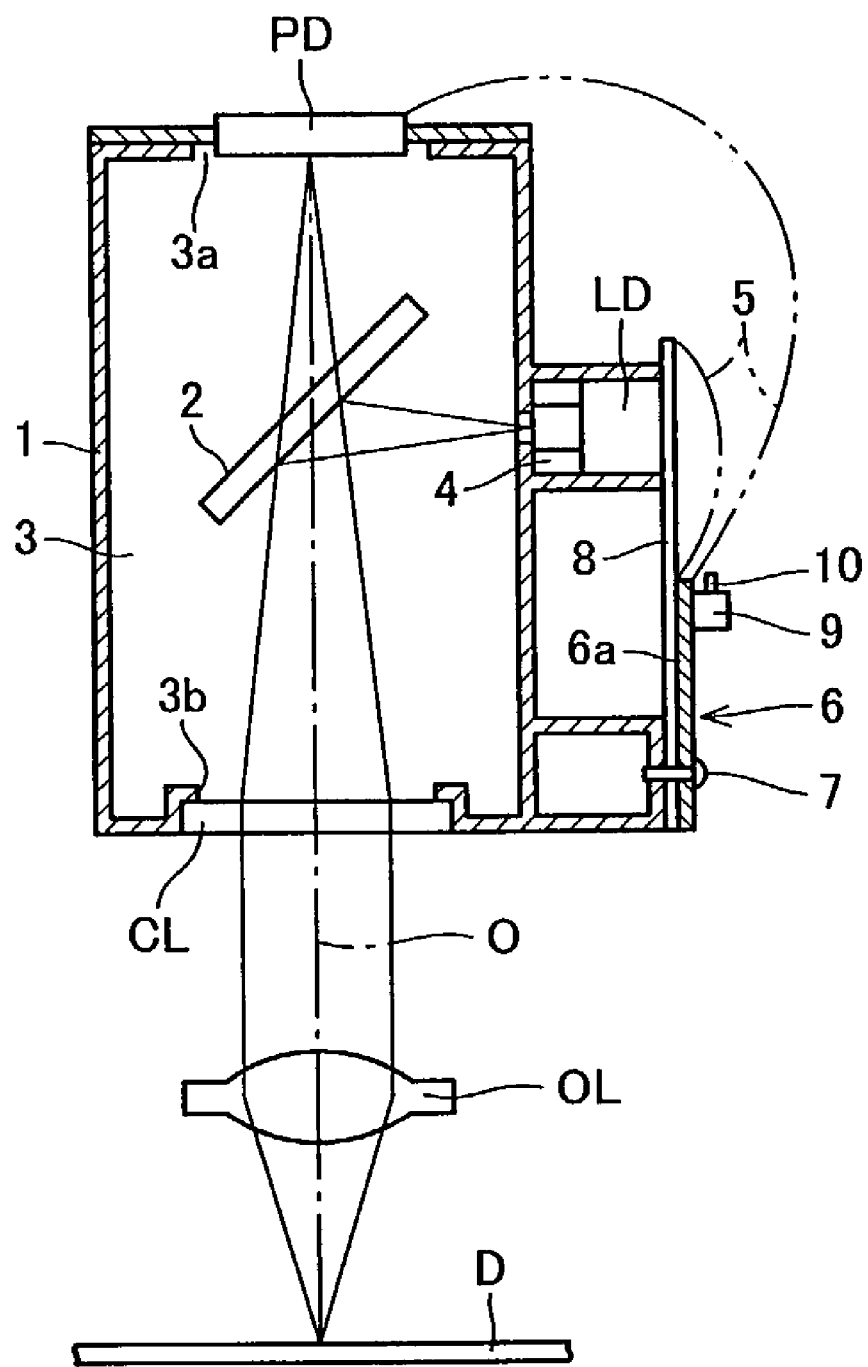
FIG. 1 illustrates the principle of an optical pickup to which the present invention is applied.
Figure 8:
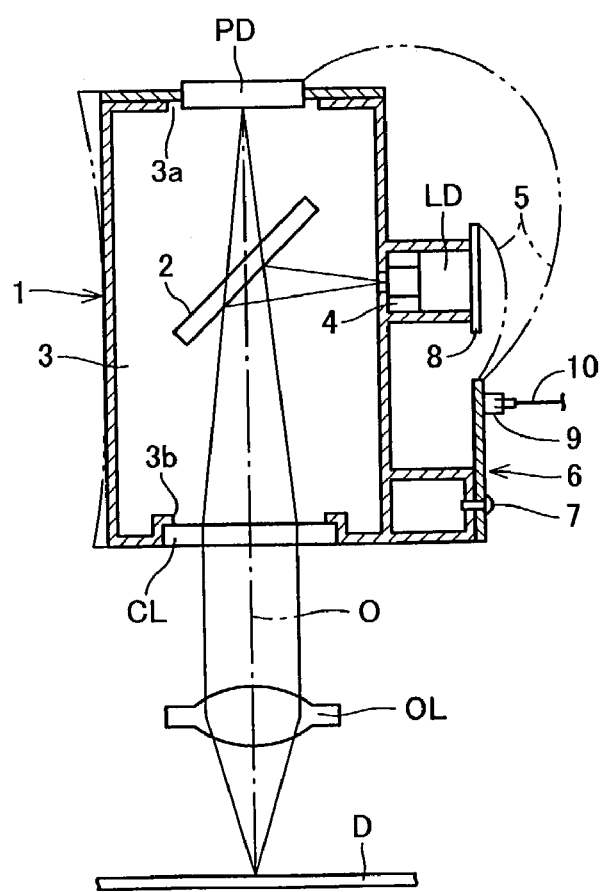
FIG. 8 is a schematic longitudinal sectional view of a conventional optical pickup.

FIG. 1 illustrates the principle of an optical pickup to which the present invention is applied. Referring to FIG. 1, a printed board 6 is mounted on a metal board body 6a, which in turn is brought into contact with a metal support substrate 8 for a laser diode LD. The remaining structure of this optical pickup is identical to that shown in FIG. 8, and hence redundant description is not repeated.

Figure 2:
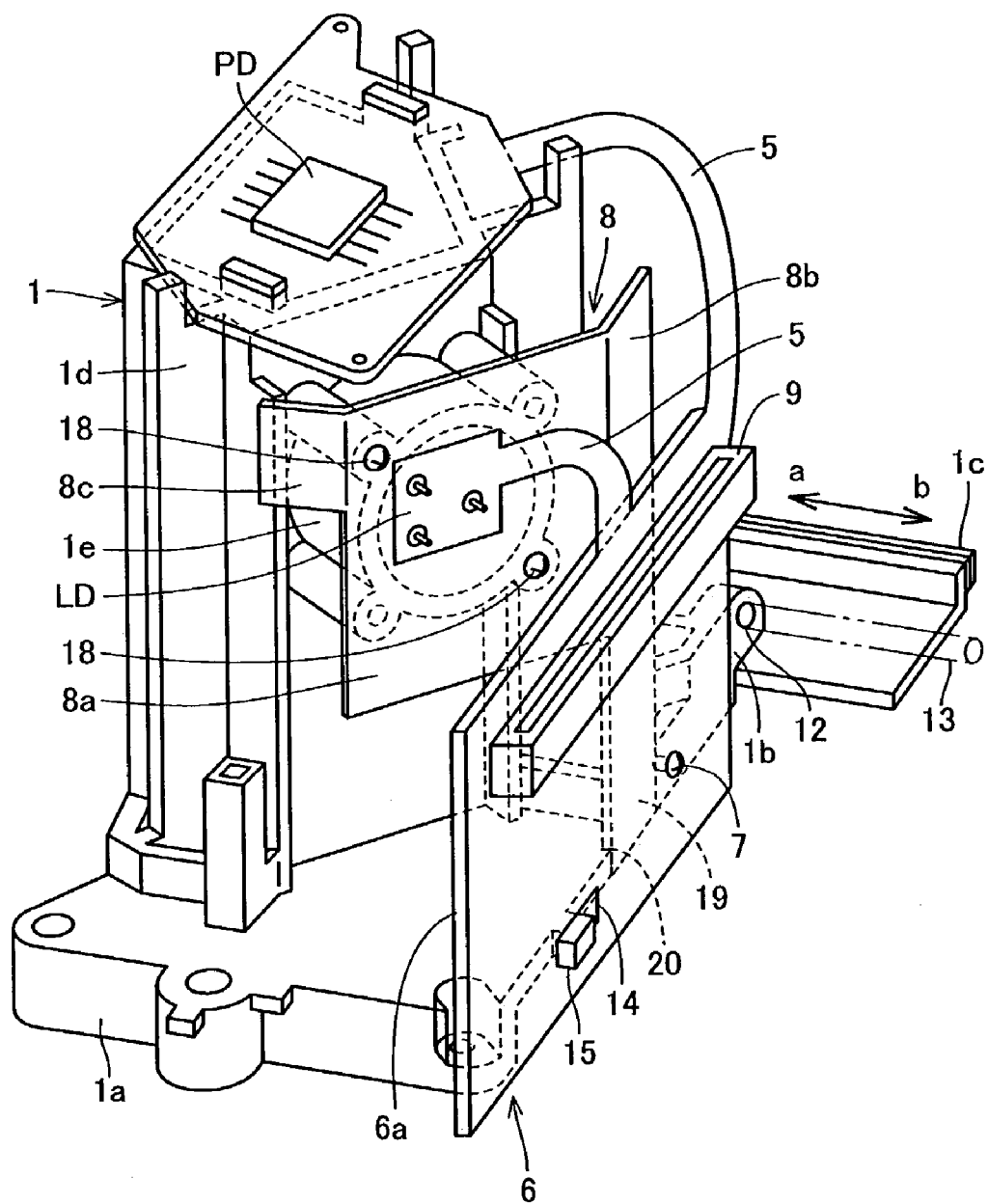
FIG. 2 is a perspective view of the optical pickup.

As shown in FIG. 2, a pickup body 1, made of hard synthetic resin, has a pair of brackets 1b and a rack 1c integrally projecting from a side surface of a base frame 1a substantially rectangular in plan view. Through holes 12 of the brackets 1b are movably engaged with a guide rod 13 for normally or reversely rotating a pinion (not shown) meshed with the rack 1c thereby moving the pickup body 1 in a direction "a" or "b" along the guide rod 13.

A photodiode PD is arranged on the upper end of a main cylinder 1d integrally projecting from the upper portion of the base frame 1a, while the laser diode LD is arranged on a branch cylinder 1e projecting from a side surface of the main cylinder 1d.

Figure 3:
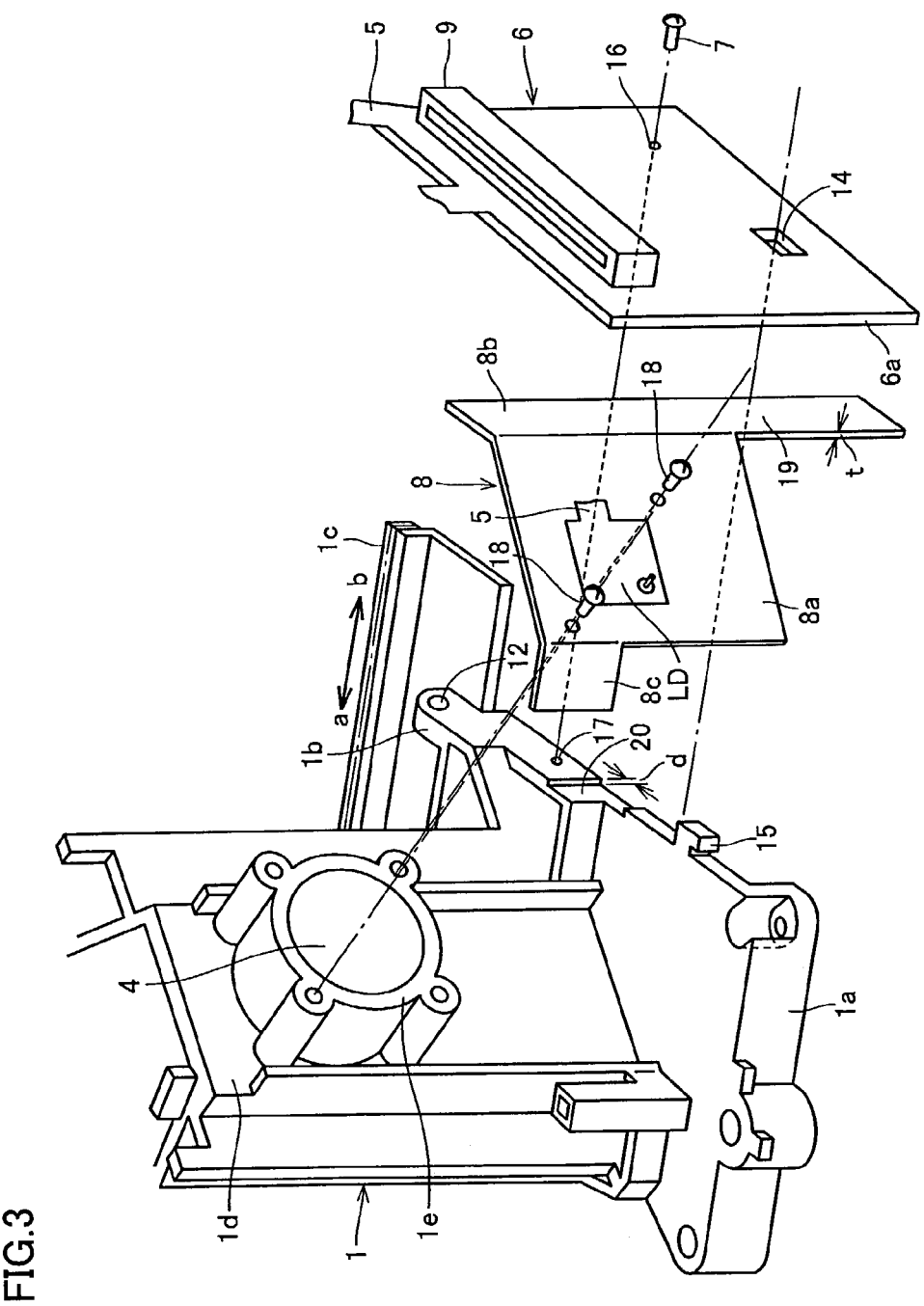
FIG. 3 is an exploded perspective view of the optical pickup.
Figure 4:
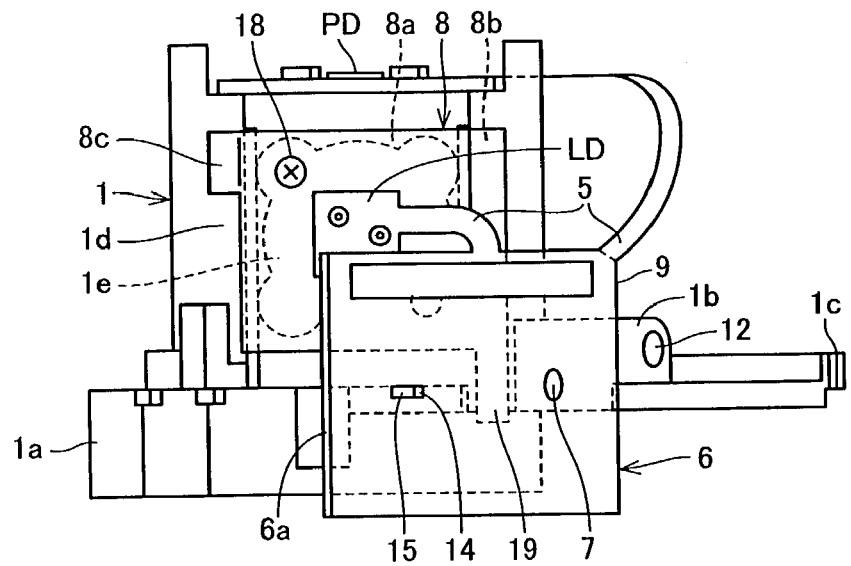
FIG. 4 is a front elevational view of the optical pickup.
Figure 5:
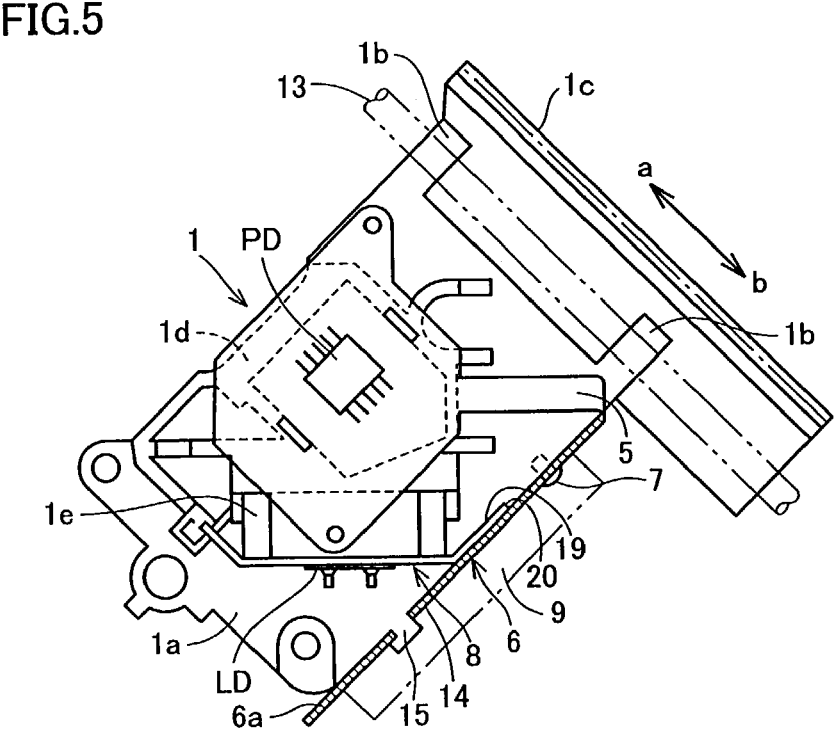
FIG. 5 is a plan view of the optical pickup.

The metal board body 6a of the printed board 6 consists of a metal plate such as a substantially rectangular aluminum plate as shown in FIGS. 3 to 5. A machine screw 7 is screwed into a screw hole 17 of the base frame 1a via a through hole 16 formed in a lower portion of the board body 6a thereby fixing the printed board 6 to the outer peripheral surface of the pickup body 1.

According to this structure, the metal board body 6a positively dissipates heat transmitted to the pickup body 1 of synthetic resin to the atmosphere. Therefore, the pickup body 1 is neither thermally expanded nor deformed by heat generated by the laser diode LD. Consequently, an optical axis O connecting the photodiode PD with an objective lens OL can be linearly maintained in a prescribed manner for preventing a reading error similarly to the conventional metal pickup body 1. Thus, a precision optical pickup can be manufactured at a low cost.

The metal support substrate 8 for the laser diode LD, formed by a metal plate of aluminum or the like bent in a U shape in plan view, consists of a central plate 8a fixed to an end surface of the branch cylinder 1e with a machine screw 18 and side plates 8b and 8c formed by bending both side edges of the central plate 8a toward the pickup body 1. An extension 19 integrally extending from the first side plate 8b has a thickness t identical to or slightly larger than the depth d of a concave groove 20 formed on the side surface of the base frame 1a oppositely to the extension 19. The extension 19 is inserted in the concave groove 20 for fixing the metal board body 6a to the side surface of the base frame 1a, thereby bringing the board body 6a into close contact with the extension 19 and the side surface of the base frame 1a.

The metal board body 6a of the printed board 6 and the metal support substrate 8 for the laser diode LD are brought into close contact with each other through the extension 19 as hereinabove described, whereby a heat dissipation area can be enlarged without increasing the size of the metal support substrate 8. Thus, the laser diode LD can be formed by a high-performance laser having high calorific power in a wide selection range. Further, the metal board body 6a, brought into close contact with the side surface of the base frame 1a, can positively dissipate heat from the pickup body 1.

While the metal board body 6a can improve the heat dissipation effect as described above, electrostatic capacitance is caused between the metal board body 6a and the printed body 6 opposed to each other.

A connector 9 is mounted on the metal board body 6a for receiving an external driving signal for the laser diode LD and outputting a read signal from the photodiode PD through the connector 9. The read signal from the photodiode PD is a high-frequency signal, the waveform of which is rounded due to the aforementioned electrostatic capacitance. This leads to a jitter influencing a tracking signal and deteriorating tracking performance. Thus, it may not be possible to read a signal from a disk.

An embodiment of the present invention implements an optical pickup ensuring a heat dissipation effect of a laser diode LD while causing no jitter in a read signal from a photodiode PD.

Figure 6:
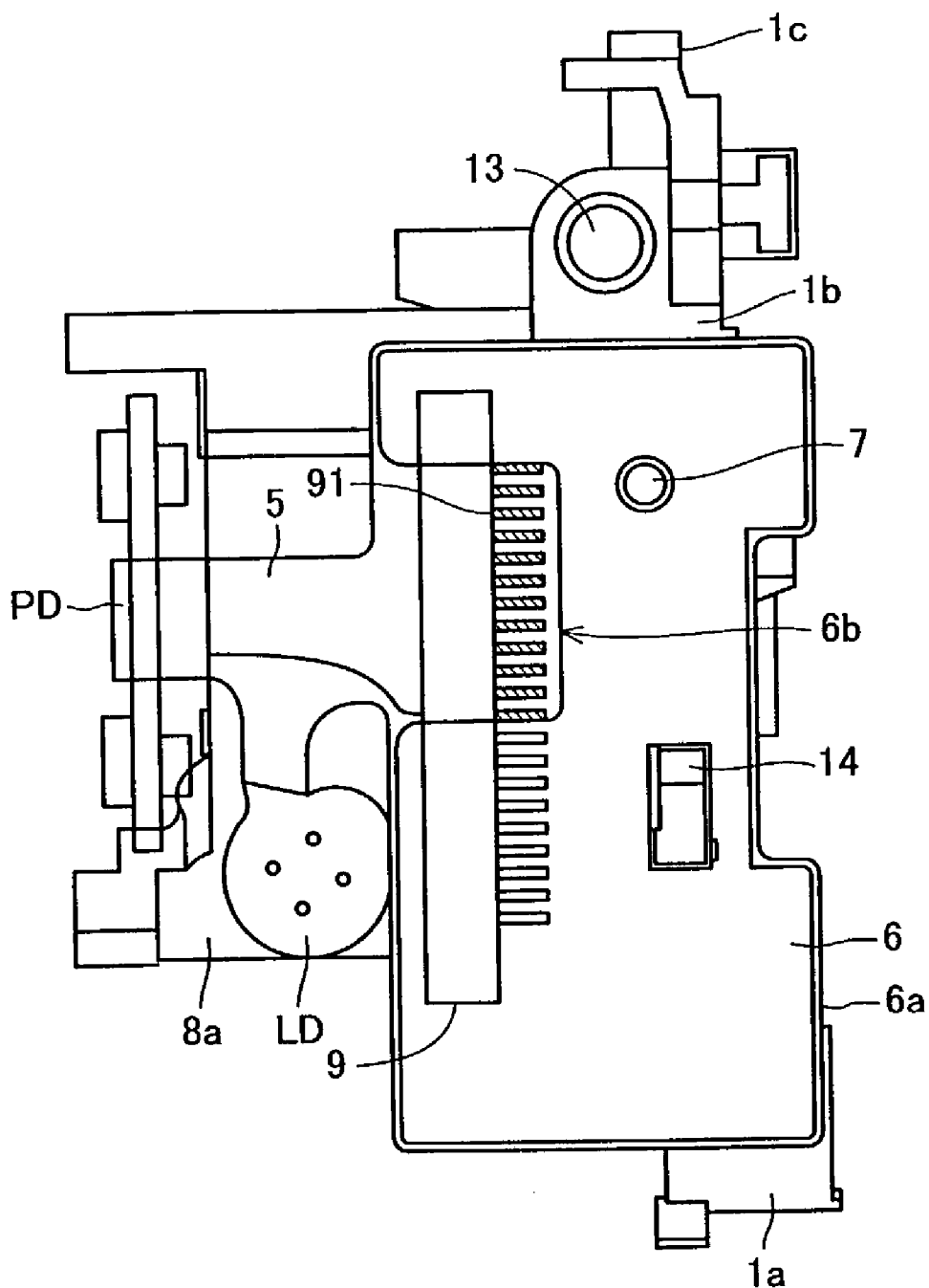
FIG. 6 illustrates an optical pickup according to an embodiment of the present invention as viewed from a metal board body.
Figure 7:
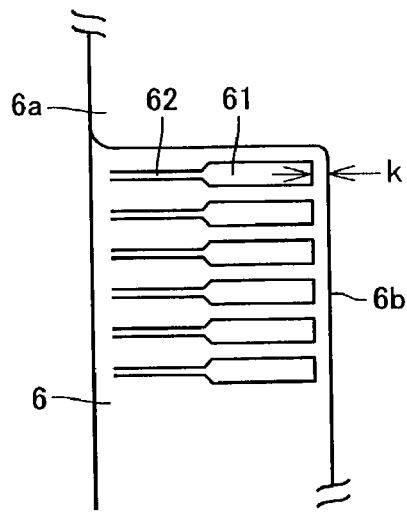
FIG. 7 illustrates a notch of the board body in detail.

FIG. 6 illustrates the optical pickup according to the embodiment of the present invention as viewed from a metal board body 6a, and FIG. 7 illustrates a notch of the metal board body 6a in detail.

As shown in FIGS. 6 and 7, a printed board 6 is formed with terminal patterns 61 and wiring patterns 62 corresponding to connector pins 91 of a connector 9 supplied with read signals from the laser diode LD and the photodiode PD. A notch 6b is formed on a portion of the metal board body 6a corresponding to the wiring patterns 62 supplied with the read signal from the photodiode PD and the terminal patterns 61 corresponding to the connector pins 91.

Referring to FIG. 7, the notch 6b of the metal board body 6a shows the pattern of the printed board 6 located under the same. The metal board body 6a can be prevented from forming electrostatic capacitance between the same and the terminal patterns 61 and the wiring patterns 62 due to the notch 6b.

As shown in FIG. 7, the interval k between the terminal patterns 61 and the notch 6b is selected to at least exceed the thickness of the metal board body 6a.

Referring to FIG. 7, the notch 6b is formed at least on the portion of the metal board body 6a corresponding to the terminal patterns 61 and the wiring patterns 62 of the connector pins 91 supplied with the read signal from the photodiode PD. Alternatively, a portion of the metal board body 6a corresponding to only the terminal pattern 61 of each connector pin 91 may be quadrangularly notched. In this case, the size of the notch of the metal board body 6a can be reduced for reducing deterioration of the heat dissipation effect.

Thus, the portion of the metal board body 6a corresponding to the terminal patterns 61 and the wiring patterns 62 corresponding to the connector pins 91 fed with a high-frequency signal is so notched that no electrostatic capacitance is caused between the metal board body 6a and the printed body 6. Therefore, the optical pickup can prevent deterioration of an error rate while preventing the high-frequency signal from a jitter thereby preventing influence on a tracking signal. Thus, the optical pickup attains strong performance also as to a disk having side-runout, decentering or smudging.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup having
   a photodiode arranged in an opening formed on an end of a light transmission hole provided with a half mirror in a pickup body of synthetic resin,
   a collimator lens and an objective lens arranged in an opening formed on another end of said light transmission hole,
   a laser diode stored in said light transmission hole on a position opposed to said half mirror and a printed board, connecting said photodiode and said laser diode to a connector through cables, provided on the outer peripheral surface of said pickup body, for the purpose of projecting a laser beam from said laser diode onto a disk through said half mirror, said collimator lens and said objective lens and receiving said laser beam reflected by said disk in said photodiode through said half mirror thereby reading information recorded in said disk, wherein
   said printed board comprises a metal board body, said metal board body having a notched portion corresponding to a connector pin portion fed with a high-frequency signal such that a terminal pattern of said printed board connected to said connector pin is arranged at a position corresponding to said notched portion, and an extension integrally provided on a metal support substrate for said laser diode is inserted in a concave groove formed on the outer peripheral surface of said pickup body for fixing said board body to said pickup body thereby bringing said board body into close contact with said extension and the outer peripheral surface of said pickup body.

2. An optical pickup having
   a photodiode arranged in an opening formed on an end of a light transmission hole provided with a half mirror in a pickup body of synthetic resin,
   a collimator lens and an objective lens arranged in an opening formed on another end of said light transmission hole,
   a laser diode stored in said light transmission hole on a position opposed to said half mirror and a printed board, connecting said photodiode and said laser diode to a connector through cables, provided on the outer peripheral surface of said pickup body, for the purpose of projecting a laser beam from said laser diode onto a disk through said half mirror, said collimator lens and said objective lens and receiving said laser beam reflected by said disk in said photodiode through said half mirror thereby reading information recorded in said disk, wherein
   said printed board comprises a metal board body, said metal board body having a notched portion corresponding to a connector pin portion fed with a high-frequency signal.

3. The optical pickup according to claim 2, wherein said board body and a metal support substrate for said laser diode are brought into contact with each other.

4. The optical pickup according to claim 3, wherein an extension integrally provided on said metal support substrate for said laser diode is inserted in a concave groove formed on the outer peripheral surface of said pickup body for fixing said board body to said pickup body thereby bringing said board body into close contact with said extension and the outer peripheral surface of said pickup body.

5. The optical pickup according to claim 2, wherein a distance between a terminal pattern of said printed board connected to said connector pin and said notched portion is set to at least exceed a thickness of said metal board body.

* * * * *